United States Patent
Van Schaack et al.

(10) Patent No.: US 7,810,730 B2
(45) Date of Patent: Oct. 12, 2010

(54) DECOUPLED APPLICATIONS FOR PRINTED MATERIALS

(75) Inventors: Andy Van Schaack, Nashville, TN (US); Stefan Burstrom, Stockholm (SE); James L. Marggraff, Lafayette, CA (US)

(73) Assignee: Livescribe, Inc., Oakland, CA (US)

( * ) Notice: Subject to any disclaimer, the term of this patent is extended or adjusted under 35 U.S.C. 154(b) by 0 days.

(21) Appl. No.: 12/415,793

(22) Filed: Mar. 31, 2009

(65) Prior Publication Data

US 2009/0261169 A1  Oct. 22, 2009

Related U.S. Application Data

(60) Provisional application No. 61/042,235, filed on Apr. 3, 2008.

(51) Int. Cl.
    *G06K 7/10* (2006.01)
(52) U.S. Cl. .................................. 235/454; 345/169
(58) Field of Classification Search ................. 235/454; 345/169

See application file for complete search history.

(56) References Cited

U.S. PATENT DOCUMENTS

| 7,175,095 | B2 | 2/2007 | Pettersson et al. |
| 7,281,664 | B1 | 10/2007 | Thaeler et al. |
| 2004/0229195 | A1 | 11/2004 | Marggraff et al. |
| 2006/0033725 | A1 | 2/2006 | Marggraff et al. |
| 2006/0066591 | A1 | 3/2006 | Marggraff et al. |
| 2006/0067576 | A1 | 3/2006 | Marggraff et al. |
| 2006/0067577 | A1 | 3/2006 | Marggraff et al. |
| 2006/0077184 | A1 | 4/2006 | Marggraff et al. |
| 2006/0078866 | A1 | 4/2006 | Marggraff et al. |
| 2006/0080608 | A1 | 4/2006 | Marggraff et al. |
| 2006/0080609 | A1 | 4/2006 | Marggraff et al. |
| 2006/0125805 | A1 | 6/2006 | Marggraff et al. |
| 2006/0127872 | A1 | 6/2006 | Marggraff et al. |
| 2006/0292543 | A1 | 12/2006 | Marggraff et al. |
| 2007/0097100 | A1 | 5/2007 | Marggraff et al. |
| 2007/0280627 | A1 | 12/2007 | Marggraff et al. |
| 2008/0097828 | A1* | 4/2008 | Silverbrook et al. .......... 705/10 |
| 2009/0295734 | A1* | 12/2009 | Hendrickson et al. ....... 345/169 |

FOREIGN PATENT DOCUMENTS

WO   WO 2007/141204 A1   12/2007

OTHER PUBLICATIONS

PCT International Search report and Written Opinion, PCT Application No. PCT/US2009/039365, May 26, 2009, 5 pages.

* cited by examiner

*Primary Examiner*—Allyson N Trail
(74) *Attorney, Agent, or Firm*—Fenwick & West LLP

(57) ABSTRACT

Interactive digital content for printed materials is provided using applications executing in a smart pen computing system. The applications and the printed materials may be developed by separate entities but appear well integrated from the perspective of a user of the smart pen computing system. Printed content produced by a first entity is obtained. The printed content is associated with a dot pattern. An application associated with the printed content and linked to the dot pattern is produced by a separate second entity. The application includes computer program instructions for, responsive to a selection within the dot pattern, invoking a function related to the printed content. The selection within the dot pattern may be made using a smart pen device, and the function may include presenting output to a user through an output device (e.g., a display or speaker) of the smart pen device.

20 Claims, 5 Drawing Sheets

DECOUPLED APPLICATIONS FOR PRINTED MATERIALS

CROSS REFERENCE TO RELATED APPLICATIONS

This application claims the benefit of U.S. Provisional Application No. 61/042,235, filed Apr. 3, 2008, which is incorporated by reference in its entirety.

BACKGROUND

This invention relates generally to pen-based computing systems, and more particularly to developing interactive content for printed material for use with the pen-based computing systems.

Printed material such as books, magazines, maps, and other reference materials are generally not interactive. These materials can be enhanced by adding interactive digital content that makes the materials more educational, enjoyable, and/or engaging. For example, a printed map of the world can be enhanced with digital content so that a user is able to select a country on the map and be presented with digital text or audio describing the country.

Typically, in a system where printed material is enhanced or combined with digital content, the printed material and the digital content are specifically and/or intentionally designed to work with each other. Often, the printed material and digital content are created by the same entity or by cooperating entities. However, the skills and resources required to create the printed materials are often different from those required to create the interactive digital content. It is also often difficult to add digital content to existing printed material that was not specifically and/or intentionally designed for the digital content. In addition, a developer of interactive digital content may not have legal rights to interesting printed material, but may be able to add significant value to it.

Accordingly, there is a need for techniques that allow for the development of interactive digital content for printed material where the digital content is decoupled from the printed material.

SUMMARY

Embodiments of the invention present a new way for providing interactive digital content for printed materials using applications executing in a smart pen computing system. The applications are decoupled from the printed materials for use with the applications in that the applications and printed materials may be developed separately. Despite being developed separately from the printed material, the applications can be well integrated with the printed material from the perspective of a user of the smart pen computing system.

In one embodiment, printed content produced by a first entity is obtained. This printed content is associated with a dot pattern. The printed content may be overlaid with a dot pattern. An application associated with the printed content and linked to the dot pattern is produced by a separate second entity. The application comprises a computer readable medium storing executable computer program instructions for, responsive to a selection within the dot pattern, invoking a function related to the printed content. The selection within the dot pattern is made using a digital pen device, and the function includes presenting output to a user through an output device (e.g., a display or speaker) of the digital pen device. In one embodiment, a plurality of different applications can be associated with a particular printed content. A particular application may be chosen by a user for use with the printed content.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
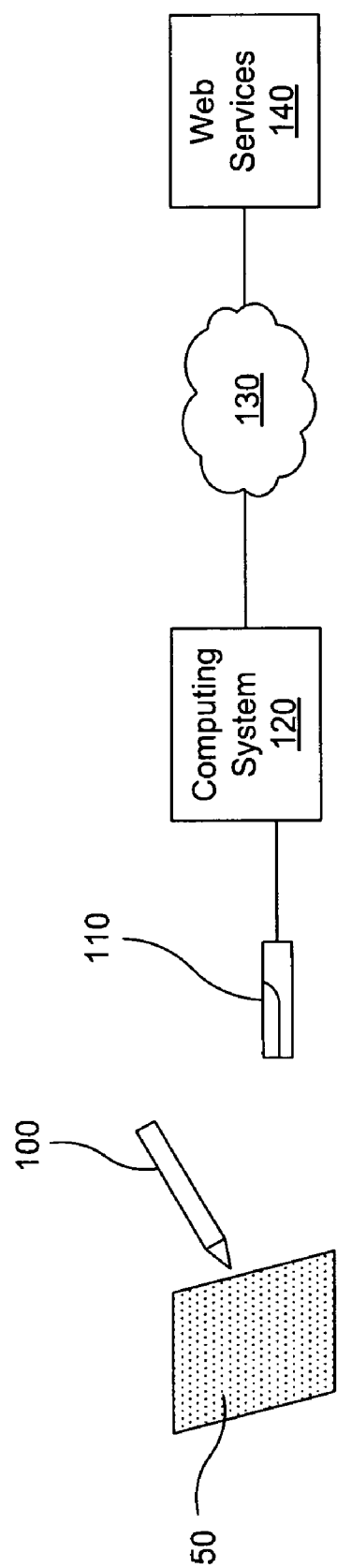
FIG. 1 is a schematic diagram of a pen-based computing system, in accordance with an embodiment of the invention.

Embodiments of the invention may be implemented on various embodiments of a pen-based computing system, and other computing and/or recording systems. An embodiment of a pen-based computing system is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
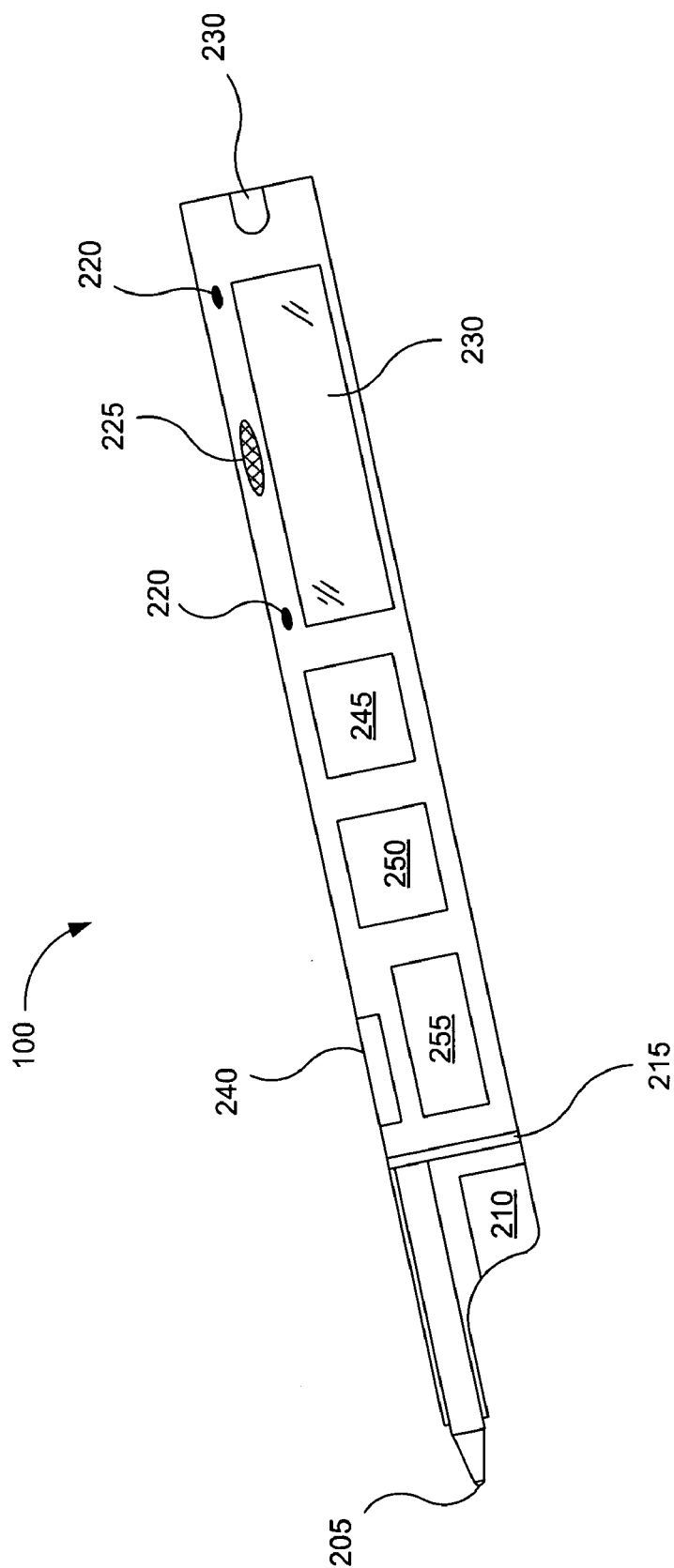
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Overview of Applications for Printed Materials

Embodiments of the invention present a new way for providing interactive digital content for printed materials using applications executing in a smart pen computing system. The applications are decoupled from the printed materials for use with the applications in that the applications and printed materials may be developed separately. Despite being developed separately from the printed material, the applications can be well integrated with the printed material from the perspective of a user of the smart pen computing system.

In one embodiment, the user receives printed material such as magazine or map. The printed material is overlaid with a dot pattern. This dot pattern enables the printed material to be recognized by a smart pen 100, and the dot pattern is nearly transparent to the user so that it does not degrade the appearance of the printed material. The user also downloads to a smart pen computing system one or more smart pen applications developed to work with the particular printed material. The user places the smart pen 100 at a particular location on the printed material, and the smart pen reads the dot pattern at the location through an imaging system 210. Based on the dot pattern, the smart pen 100 recognizes the printed material and determines one or more available applications for use with the printed material. The user selects a particular available application and the application is executed, providing interactive digital content to the user. In one embodiment, the application allows the user to place the smart pen 100 at a particular location on the printed material and receive information associated with the location. This additional information may be presented by the smart pen's display 235 or speakers 225 or can be presented by a computing system 120 attached to the smart pen, for example.

The following discussion of various embodiments of the invention is presented with reference to the figures. FIG. 1 is a block diagram of an example architecture for providing interactive digital content for printed materials. FIG. 1 illustrates a piece of dot-enabled paper 50 and a smart pen 100 that can be used in conjunction with the paper 50. The operations described below may be performed by an application running on the processor of the pen 100, by an application running on an attached computing system 120, or a combination of the two. In one embodiment, the dot-enabled paper 50 is printed material overlaid with a dot pattern.

Figure 3:
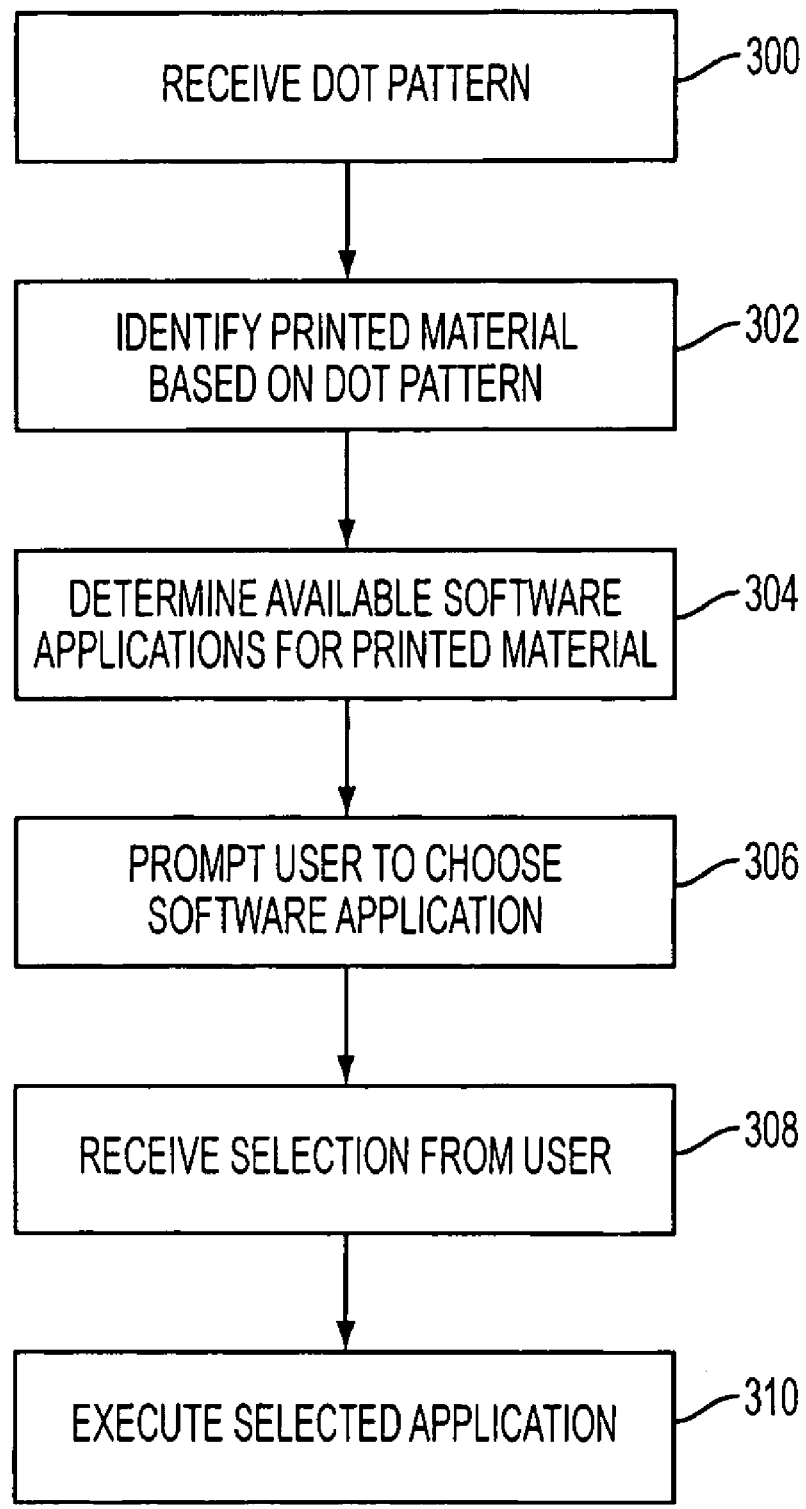
FIG. 3 illustrates an embodiment of a process for providing interactive digital content for printed materials using applications in a smart pen computing system.

FIG. 3 illustrates an embodiment of a process for providing interactive digital content for printed materials using applications in a smart pen computing system. In this process, the imaging system 210 of a smart pen 100 is positioned at a location on printed material 50. The imaging system 210 receives 300 the dot pattern overlaid on the printed material. Based on the dot pattern received from the imaging system 210, the smart pen identifies 302 the printed material. The smart pen determines 304 available software applications for the identified printed material. These applications may be stored on the smart pen 100 or in the attached computing system 120, and may have previously been downloaded by the user or otherwise provided to the user. In one embodiment, when a user downloads an application for printed material, the dot pattern of the printed material is also downloaded and stored by the smart pen 100 so that the smart pen is able to identify the application at a later time based on the dot pattern.

If there is more than one available application available for the identified printed material, the smart pen 100 may prompt 306 the user to choose one of the available applications. The smart pen may present the prompt to the user through the display or speaker of the smart pen, for example. The smart pen receives 308 a selection of an application from the user in response. The smart pen then executes 310 the selected application, providing interactive digital content to the user in connection with the printed material.

In one embodiment, the smart pen does not explicitly prompt the user to choose an available application. The user may choose an application by making a gesture with the smart pen 100 that is recognized by smart pen as a choice of a particular application. For example, a user can make an upstroke with the smart pen 100 over a dot pattern overlaying a particular printed word that selects an application that speaks the word in English through a speaker of the smart pen. A user can make a downstroke with the smart pen 100 over the same word to select and application that speaks the word in Chinese. In one embodiment, speaks the name of the application into a microphone of the smart pen 100. For example, the user speaks "pronunciation" and then taps a printed word with the smart pen, causing a pronunciation application to pronounce the word through speakers of the smart pen. Instead, the user may speak "definition" and tap the same word to hear a definition of the word. Various other methods are possible for receiving a selection of an application from the user.

Figure 4:
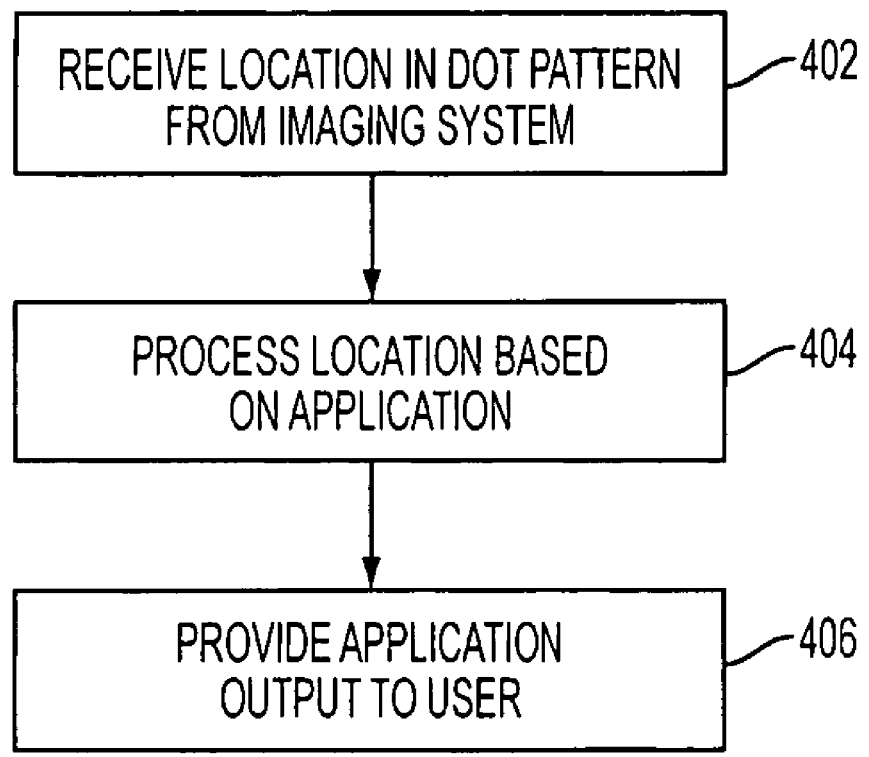
FIG. 4 illustrates an embodiment of a process of an application for providing interactive digital content for printed materials.

FIG. 4 illustrates an embodiment of a process of an application for providing interactive digital content for printed materials. In this process, a particular printed material and application have been identified, as illustrated in FIG. 3 or by other appropriate means. The application has been developed for use with the printed material and has knowledge of the dot pattern associated with the printed material. The user places the imaging system 210 of the smart pen 100 at a particular location on the printed material overlaid with a dot pattern. The smart pen receives 402 a location in the dot pattern within the printed material. The smart pen processes 404 the location based on the particular application. For example, if the printed material is a map, the smart pen may determine a particular state or country associated with the location. The smart pen provides 406 output to the user based on the processing. Continuing the above example, the smart pen 100 may display information about the particular state or country on its display 235.

Figure 5:
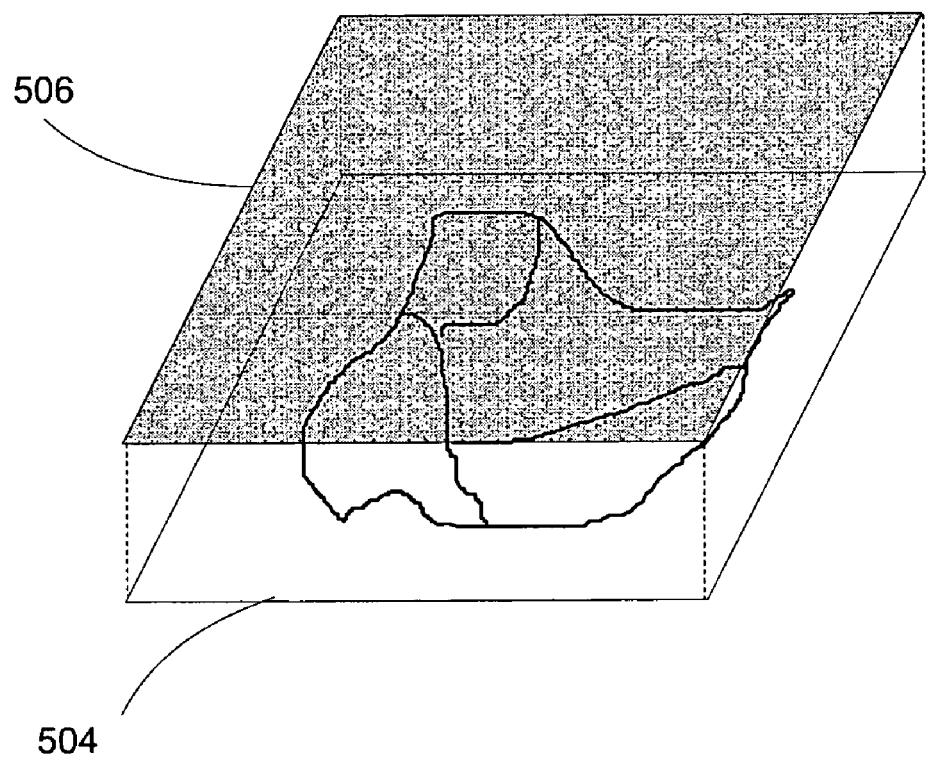
FIG. 5 illustrates an example of printed material overlaid with a dot pattern.

FIG. 5 illustrates an example of printed material overlaid with a dot pattern. In FIG. 5, the printed material 504 is a map of a particular country or geographic region. Other examples of printed material include newspapers, magazines, books, and posters. The map can be printed on various types of media such as paper or plastic, and can be printed in color or black and white. An overlay dot-pattern 506 is added to the map.

This dot-pattern can be printed on the map at the same time the map is printed or can be added later or beforehand in a separate printing process. The dot-pattern can also be placed above the map, for example using a transparency. The dot pattern is recognized by the smart pen 100, but does not significantly degrade the printed material when viewed by a user.

Decoupled Applications

Decoupling of smart pen applications and printed material can be achieved by having a first entity prepare the printed material (also referred to as printed content) with a coded pattern, and having a second entity (or any number of entities) develop a software application with digital interactive content for use by the smart pen computing system in conjunction with the printed material. This development model allows different entities to specialize in their particular expertise. Also, with decoupled applications, a creator of printed materials can allow third parties to develop useful interactive applications for use with the printed materials. Though developed separately, the printed material and digital content appears as a unified product from the user's perspective.

In one embodiment, the first entity produces printed material, not necessarily with an overlaid dot pattern. The dot pattern may be associated with the printed material in various ways. A second entity may overlay the printed content with a dot pattern, for example, and provide information regarding the association to other entities. In another example, portions of printed content can be associated with various non-overlaid dot pattern segments. A variety of associations between dot patterns and printed material can be made and information regarding these associations disseminated to entities developing applications and to users.

Multiple separate entities can create digital content for a single item of printed material. In one embodiment, each entity creates a software application to run on the smart pen 100 that performs steps illustrated in FIG. 4 above. In one example, a large, established map company prints and distributes a high quality street map of the San Francisco Bay Area overlaid with a dot pattern. The map company may also release information to third parties related to the dot pattern regions associated with the map. Interested third parties could then develop content that when downloaded by end users would enable them to interact with the map as though the complete product had come from one company. Multiple developers or a single developer could create different interactive digital content for the same base printed material.

For example, one developer might create a first application that includes an audio interface for the map labels, where a user places a smart pen on a map label and the pen produces an audio output of the label through its speakers. Another developer might create a second application for wayfinding, where the user taps on two points with the smart pen and the application tells the user the distance between the two points and the heading from the first point to the second, or a route along roads from the first point to the second. The application can output this information as audio or display the information on the smart pen display. Another developer may create a third application that combines the output from the above two applications. For example, a user taps on one location on the map and then another. The third application receives travel directions from the second application and provides this information to the first application to create a talking navigation system.

By decoupling the printed material from the software applications, software developers who may not have the rights to interesting print content can still add value to it. It may be in the interest of the original print content owner to encourage software developers to produce interactive content because such content adds additional value of interest to a variety of consumers.

For example, a newsweekly magazine with a wide circulation can overlay all of its pages with a dot pattern and can publish specifications describing the regions covered by the dot pattern and/or the underlying image. This enables third parties (e.g., software developers) to create applications that can, for example, read the pages out loud, make advertisements interactive, provide definitions for challenging words, provide commentary by pundits, and provide foreign language translations. For example, a user can point to a news story (or portion of a news story) with a smart pen 100 and hear an audio commentary by a pundit. The user can download a software application to the smart pen that provides a particular type of commentary (e.g., from a conservative or liberal viewpoint). By making its content easily accessible to software developers, the magazine can provide greater appeal to readers with specific interests, and gain a competitive advantage.

A user can purchase third party interactive content either by purchasing it outright or by purchasing a subscription that is periodically updated. The third party content is available as a software application that can be downloaded to the smart pen (e.g., downloaded from a website via a web browser running on the attached computing system 120). The software application can be downloaded and stored on the smart pen, or downloaded on demand when needed by the user and erased afterward to free up space on the storage device in the smart pen.

In one embodiment, once a user has purchased the interactive content, the user taps on the printed document with the smart pen to access it. When the user taps on the document, a the smart pen receives 300 a dot pattern from the printed material, and a base application in the smart pen is run that searches through a database of third party applications to determine if there are any applications written for the printed document, as in step 304. This base application is always present in the smart pen and it is able to recognize the printed document of interest by analyzing the received dot pattern. In one embodiment, the user taps a specified area of the printed document containing an identifying dot pattern. As mentioned above, it is possible that there are multiple applications corresponding to a particular printed document. In that case, the user is asked to select the desired application and this selection is received 308 by the smart pen.

A software application providing interactive content can be associated with more than one printed document. The application can link the printed documents together or facilitate synergistic uses of the documents. For example, a user might own a copy of the Central Intelligence Agency (CIA) World Factbook that contains a great deal of U.S. Government-produced reference material. The user might also own a high resolution wall map produced by The National Geographic Society. An application developer can produce an application that enables the user to tap on a country on the wall map to access material from the CIA World Factbook for that country.

As mentioned above, multiple parties are involved in a system that provides decoupled applications for printed materials. These parties include the owner of the copyright of the base printed material, developers of applications, developers of raw content accessible to application developers (e.g., audio clips or reference text), and developers of applications that combine the features of multiple applications. As a result, it is useful to provide a means for any parties involved in the system to share royalties.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing interactive digital content for printed content, comprising:
    receiving a dot pattern on a writing surface, the receiving performed by a smart pen device;
    determining a plurality of available applications for a particular printed content associated with the received pattern;
    receiving a selection from a user of a particular available application from the plurality of available applications; and
    executing the particular available application, the executing comprising invoking a function related to the printed content.

2. The method of claim 1, wherein an output of the function is based on a location of the smart pen device on the writing surface.

3. The method of claim 1, wherein the plurality of available applications are downloaded to the smart pen device from providers of the available applications.

4. The method of claim 1, wherein the function comprises presenting output to a user through an output device of the smart pen.

5. The method of claim 1, further comprising:
    receiving a selection within the dot pattern, wherein the function comprises presenting audio output to a user representing a word associated with the received selection within the dot pattern.

6. The method of claim 5, wherein the audio output is a translation of the associated word.

7. The method of claim 5, wherein the audio output is a pronunciation of the associated word.

8. A computer program product for providing interactive digital content for printed content, the computer program product comprising a computer-readable storage medium containing computer program code for:
    receiving a dot pattern on a writing surface, the receiving performed by a smart pen device;
    determining a plurality of available applications for a particular printed content associated with the received pattern;
    receiving a selection from a user of a particular available application from the plurality of available applications; and
    executing the particular available application, the executing comprising invoking a function related to the printed content.

9. The computer program product of claim 8, wherein an output of the function is based on a location of the smart pen device on the writing surface.

10. The computer program product of claim 8, wherein the plurality of available applications are downloadable to the smart pen device from providers of the available applications.

11. The computer program product of claim 8, wherein the function comprises presenting output to a user through an output device of the smart pen.

12. The computer program product of claim 8, wherein the computer-readable storage medium further contains computer program code for:
    receiving a selection within the dot pattern, wherein the function comprises presenting audio output to a user representing a word associated with the received selection within the dot pattern.

13. The computer program product of claim 12, wherein the audio output is a translation of the associated word.

14. The computer program product of claim 12, wherein the audio output is a pronunciation of the associated word.

15. A smart pen device comprising a processor and a memory, the memory comprising instructions for execution by the processor for causing the processor to:
- receive a dot pattern on a writing surface;
- determine a plurality of available applications for a particular printed content associated with the received pattern;
- receive a selection from a user of a particular available application from the plurality of available applications; and
- execute the particular available application, the executing comprising invoking a function related to the printed content.

16. The smart pen device of claim 15, wherein an output of the function is based on a location of the pen on the writing surface.

17. The smart pen device of claim 15, wherein the plurality of available applications are downloadable to the pen from providers of the available applications.

18. The smart pen device of claim 15, wherein the function comprises presenting output to a user through an output device of the pen.

19. The smart pen device of claim 15, wherein the memory further comprises instructions for execution by the processor for causing the processor to:
- receive a selection within the dot pattern, wherein the function comprises presenting audio output to a user representing a word associated with the received selection within the dot pattern.

20. The smart pen device of claim 19, wherein the audio output is a pronunciation of the associated word.

* * * * *